(12) United States Patent
Boyer et al.

(10) Patent No.: US 7,980,220 B2
(45) Date of Patent: Jul. 19, 2011

(54) STAGGERED INTAKE VALVE OPENING WITH BIFURCATED PORT TO ELIMINATE HYDROGEN INTAKE BACKFIRE

(75) Inventors: Brad Alan Boyer, Canton, MI (US);
Hosuk Howard Jung, Troy, MI (US);
William Francis Stockhausen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 921 days.

(21) Appl. No.: 11/867,089

(22) Filed: Oct. 4, 2007

(65) Prior Publication Data

US 2009/0093949 A1    Apr. 9, 2009

(51) Int. Cl.
*F02D 41/30* (2006.01)
*F02M 9/12* (2006.01)

(52) U.S. Cl. ........... 123/432; 701/105; 123/90.15

(58) Field of Classification Search ............ 123/432, 123/302, 585, 90.15; 701/103–105
See application file for complete search history.

(56) References Cited

U.S. PATENT DOCUMENTS

| | | | |
|---|---|---|---|
| 4,528,958 A * | 7/1985 | Yoshida et al. | 123/432 |
| 5,228,423 A | 7/1993 | Oikawa et al. | |
| 5,305,714 A | 4/1994 | Sekiguchi et al. | |
| 5,564,388 A * | 10/1996 | Meiwes et al. | 123/585 |
| 6,609,499 B2 | 8/2003 | Kabat et al. | |
| 7,216,640 B2 * | 5/2007 | Song et al. | 123/481 |

FOREIGN PATENT DOCUMENTS

| | | |
|---|---|---|
| FR | 2548278 | 1/1985 |
| JP | 56018030 | 2/1981 |
| JP | 57210126 | 12/1982 |
| JP | 58082022 | 5/1983 |
| JP | 61118526 | 6/1986 |

OTHER PUBLICATIONS

ISA United Kingdom International Search Report of GB0815826.3, Dec. 9, 2008, 1 page.

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

A method is described for operating a gaseous fueled engine, where gaseous fuel and intake air are delivered to a first intake port of a cylinder of the engine and intake air without gaseous fuel is delivered to a second intake port of the cylinder, the first port separated from the second port. Further, the method includes inducting the fuel and intake air from the first port via a first intake valve, and the intake air from the second port via a second intake valve, into the cylinder, where the first intake valve is opened after the second intake valve.

17 Claims, 5 Drawing Sheets

STAGGERED INTAKE VALVE OPENING WITH BIFURCATED PORT TO ELIMINATE HYDROGEN INTAKE BACKFIRE

BACKGROUND AND SUMMARY

Engines may utilize hydrogen fuel injection to improve fuel economy and/or emissions. In one approach, port fuel injection of hydrogen may be used, where gaseous fuel is delivered to an intake port of each cylinder. With port fuel injection, the injection event may be set to begin after forward air flow in the cylinder (which occurs after intake valve opening and piston downward movement on the intake stroke), and the injection event may be set to end at approximately bottom dead center of the intake stroke. Such a setting reduces the potential for easily ignitable hydrogen to be present in the intake port or manifold for exposure to hot exhaust residual/hot combustion chamber metal surfaces for the subsequent engine cycle.

However, as engine speed increases, a given injection amount, or pulsewidth, may result in a proportionally greater injector duty cycle as a function of crank angle. If the injection duration is longer than the intake duration (e.g., longer than the intake stroke, and/or longer than intake valve opening), hydrogen may be present in the intake port before intake valve opening of the following engine cycle. Further, such hydrogen can be prone to igniting due to hot gases/metal temperature, potentially causing an undesirable intake backfire.

One approach to address such situations is to improve the bandwidth of the hydrogen injectors. However, while higher bandwidth injectors may be helpful, they still may not have the bandwidth to control the injection event to only occur during the intake event under all conditions. For example, the injector bandwidth may be insufficient to provide such control at low speeds and loads as well as at high speeds and loads.

Another approach to address such situations is to first cool the cylinder with fresh air having little to no hydrogen fuel, and then subsequently deliver pre-mixed air and hydrogen. Such operation may be achieved with a bifurcated intake port leading to separated intake valves, where the timing of the intake valve openings of the valves are staggered relative to one another.

In this way, it is possible to reduce backfires since initially fresh air free of hydrogen cools the charge, so that when the hydrogen enters the cylinder, it does not contact overly hot surfaces or other charge.

Note that the above examples are merely for introductory purposes, and the various examples and embodiments described herein are not limited to such situations.

DETAILED DESCRIPTION

Figure 1:
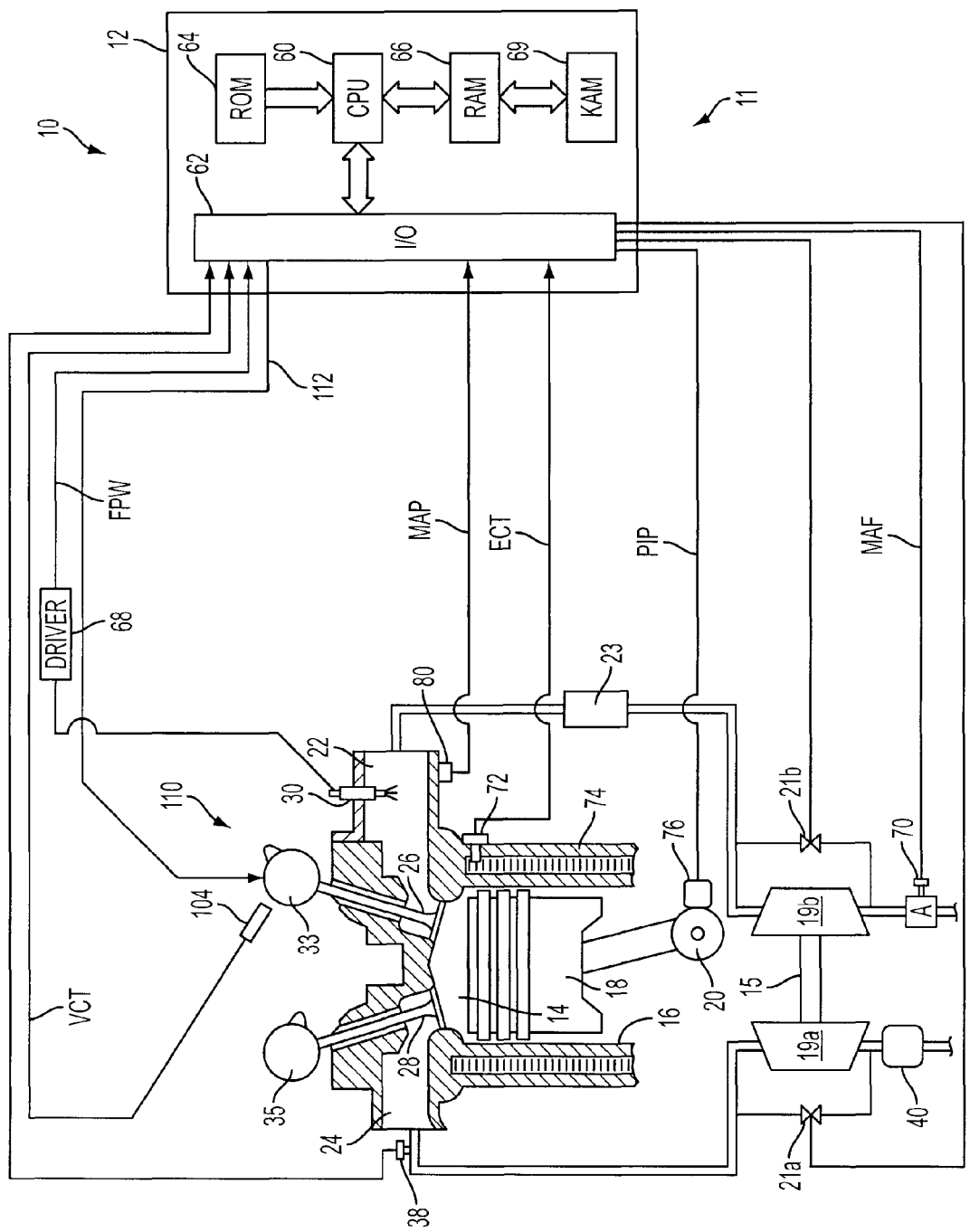
FIG. 1 is a schematic depiction of an exemplary embodiment of a hydrogen fueled engine cylinder.
Figure 2:
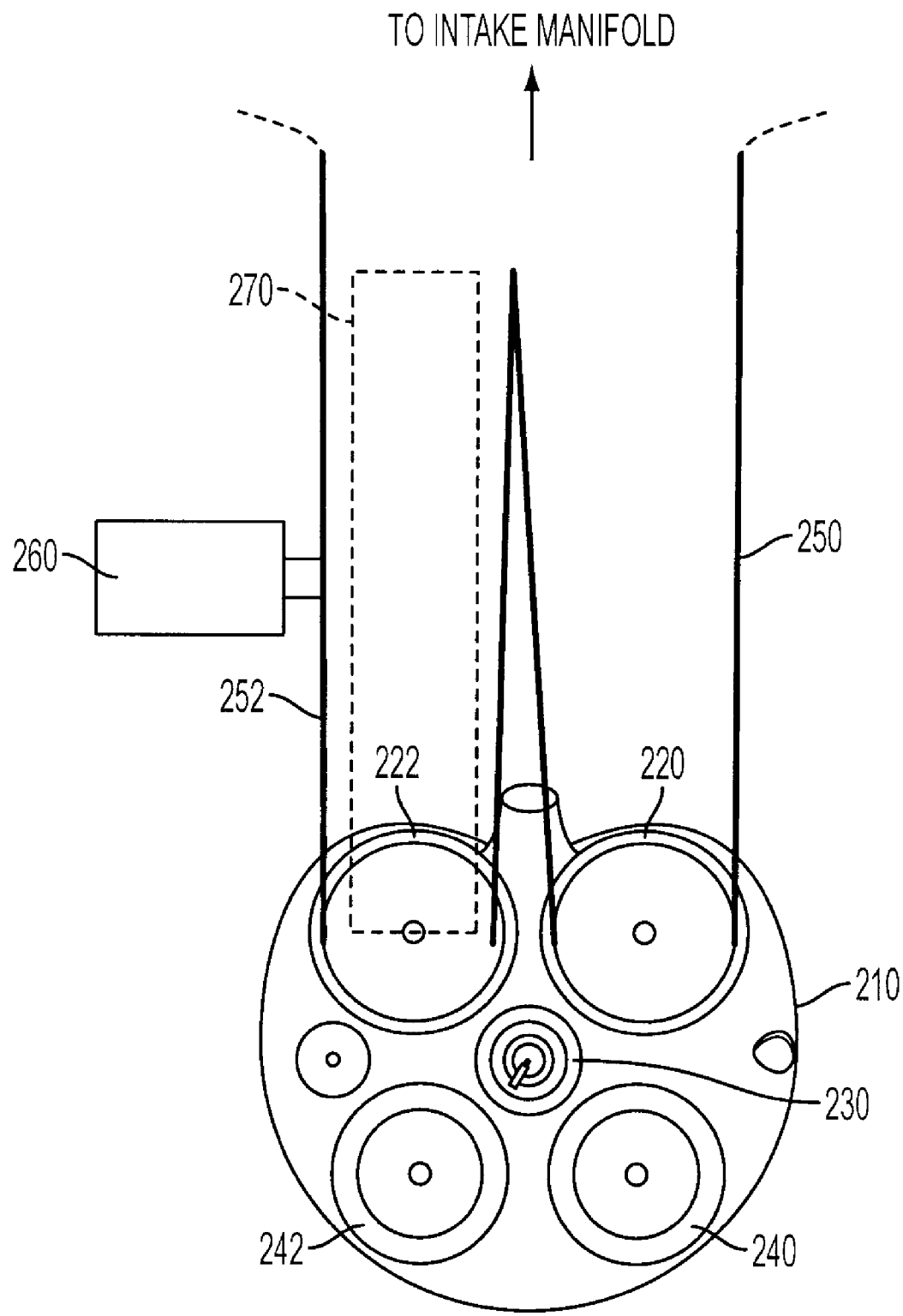
FIG. 2 shows additional details of the cylinder and intake system of FIG. 1.

FIG. 1 shows, generally at 10, an exemplary embodiment of one cylinder of a multi-cylinder engine, intake and exhaust paths connected to that cylinder. It will be appreciated that the configuration of engine 10 is merely one example, and numerous variations are possible. FIG. 2 shows an example intake port configuration that may be used with engine 10, such that engine 10 may be operated with hydrogen fuel to achieve improved resistance against engine backfire due to its intake port design staggered intake valve timing, as described further herein.

Continuing with FIG. 1, engine 10 is controlled by a control system 11 that may include on or more controllers, such as electronic engine controller 12. Combustion chamber, or cylinder, 14 of engine 10 is shown including combustion chamber walls 16 with piston 18 positioned therein and connected to crankshaft 20. Combustion chamber 14 is shown communicating with intake manifold 22 and exhaust manifold 24 past intake valve(s) 26 and exhaust valve(s) 28. Note that while a single intake and single exhaust valve are depicted, a plurality of intake and/or exhaust valves may be used, as described further herein. Also, in this example, a common intake cam 33 may actuate one or more intake valves, and a common exhaust cam 35 may actuate one or more exhaust valves. The intake valves may have staggered valve timing, such that one intake valve may open and/or close before another intake valve of the cylinder.

Fuel injector 30 is coupled to combustion chamber 14 for delivering injected fuel into the intake manifold, head, or port in proportion to the fuel pulse width (fpw) signal received from controller 12 via conventional electronic driver 68. Fuel is delivered to fuel injector 30 by a gaseous fuel system (not shown) including a fuel tank, fuel pumps, and a fuel rail. In one example, the gaseous fuel may include hydrogen.

Turbocharger 19 has a turbine 19a coupled in the exhaust manifold 24 and a compressor 19b coupled in the intake manifold 22 via an intercooler, 23. Turbine 19a is typically coupled to compressor 19b via a drive shaft 15. Various types of turbochargers and arrangements may be used. For example, a variable geometry turbocharger (VGT) may be used where the geometry of the turbine and/or compressor may be varied during engine operation. Alternately, or in addition, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve. FIG. 1 shows an example valve 21a acting as a waste gate. As noted above, the valve may be located within the turbine, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.) to reduce surge while reducing driveability and/or emission impacts.

Exhaust gas sensor 38 is shown coupled to exhaust manifold 24 upstream of turbine device 19a. After treatment device 40 may include any suitable type of device for reducing emissions from engine 10. Examples include, but are not limited to, three-way and four-way catalytic converters, particulate filters, NOx traps, etc.

Controller 12 is shown in FIG. 1 as a microcomputer, including microprocessor unit 60, input/output ports 62, an electronic storage medium for executable programs and calibration values (shown as read only memory chip 64 in this particular example), random access memory 66, keep alive memory 69, and a conventional data bus. Controller 12 is shown receiving various signals from sensors coupled to engine 10, in addition to those signals previously discussed, including measurement of inducted mass air flow (MAF) from mass air flow sensor 70 coupled upstream of compressor 19b; engine coolant temperature (ECT) from temperature sensor 72 coupled to cooling sleeve 74; a profile ignition pickup signal (PIP) from Hall effect sensor 76 coupled to crankshaft 20; and manifold absolute pressure (MAP) signal from sensor 80.

Engine 10 may be configured to have variable intake valve and/or variable exhaust valve timing capabilities. In one example, a variable cam actuation system 110 may be used to advance and/or retard one or more intake valves, where the system receives a command signal 112 that controls valve timing relative to crankshaft timing (e.g., by adjusting intake cam 33) based on the PIP signal and a signal from camshaft sensor 104. In an alternative example, separate intake cam timing and exhaust cam timing actuators may be used. In still another example, multiple intake actuators may be used to separately control intake valve timing of first and second intake valves in the cylinder. Further, while various examples of adjusting cam timing are illustrated, other variable valve actuation may be used, such as electromechanically actuated valves (camless), or others.

Additionally, the engine may be spark ignited via a spark plug located in the cylinder (not shown), the timing of which may be varied with operating conditions.

It will be understood that FIG. 1 merely shows one cylinder of a multi-cylinder engine, and that each cylinder has its own set of intake/exhaust valves, fuel injectors, etc.

Note that the control and estimation routines included herein below can be used with various engine configurations, such as those described above, and implemented in the control system 11. The specific routine described herein may represent one or more of any number of processing strategies such as event-driven, interrupt-driven, multi-tasking, multi-threading, and the like. As such, various actions, steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, steps or functions may be repeatedly performed depending on the particular strategy being used. Further, the described actions, steps, or functions may graphically represent code to be programmed into the computer readable storage medium in controller 12.

Referring now to FIG. 2, an example intake configuration of engine 10 is shown. Specifically, FIG. 2 shows cylinder head 210 having two intake valves (220, 222), a spark plug 230, and two exhaust valves (240,242) coupled to bifurcated intake ports 250 and 252, where a hydrogen injector 260 is located to inject fuel only to intake port 252. For example, injector 260 may be located downstream of the bifurcation of the ports.

As noted herein, intake valves 220, 222 may be opened/closed by a camshaft (not shown), where the lobes of the camshaft are configured so that different valve timings are achieved. In particular, intake valve 222 may have a delayed intake valve timing (e.g., between 20 to 60 crank angle degrees) relative to valve 220. Further, intake valve 220 may communicate only with intake port 250, and intake valve 222 may communicate only with intake port 252. Further, the bifurcated volume of intake port 252, as indicated by the dashed region 270, may be sized such that it is sufficient to prevent spill-over of injected fuel into the adjacent port 250. In this way, one example, the bifurcated volume may be selected to be approximately 30% of the cylinder displacement for conditions when the engine is operating at a stoichiometric air/fuel ratio.

Figure 3:
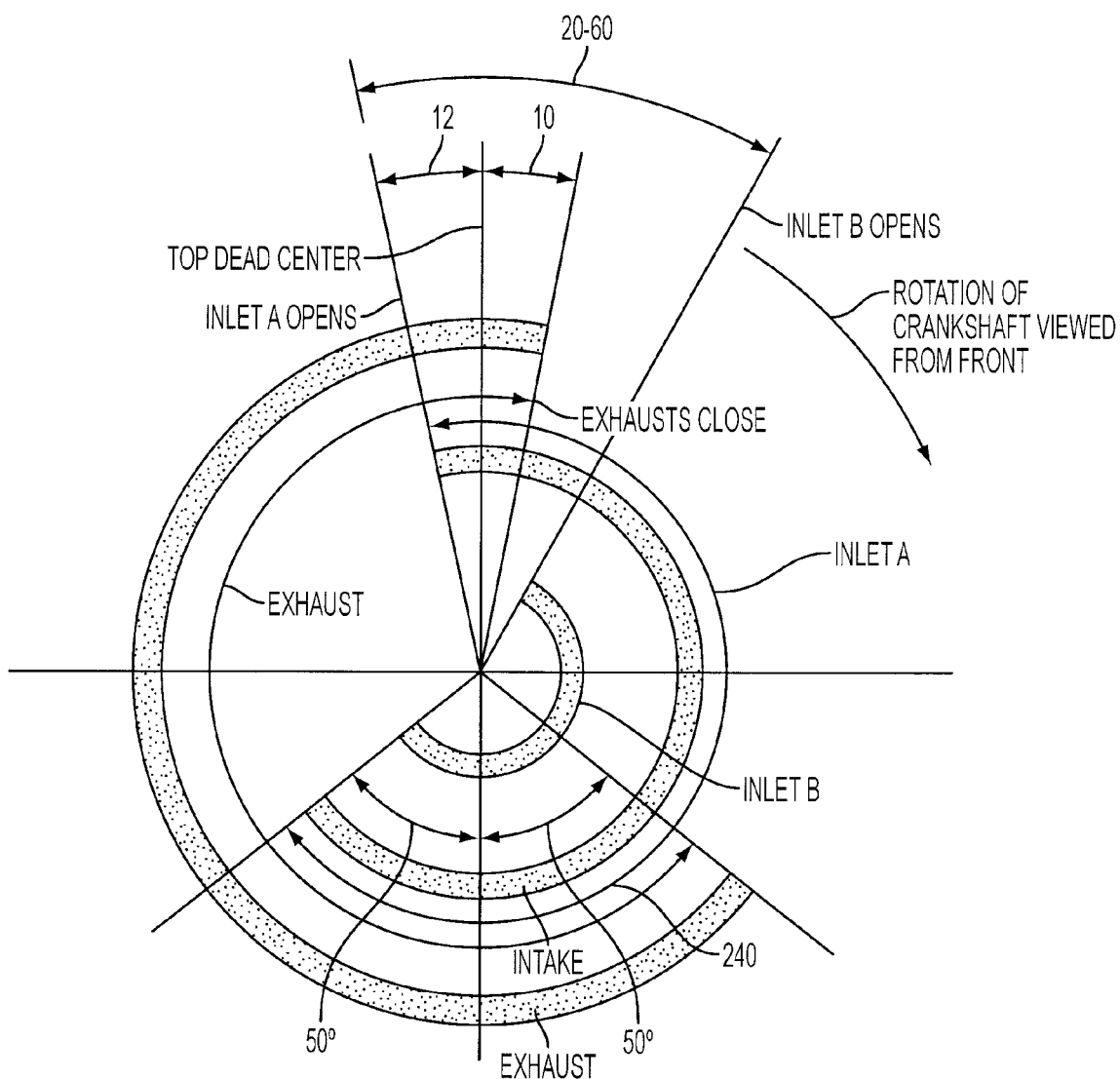
FIG. 3 shows an example timing diagram.

FIG. 3 shows additional details of the intake valve timing of valves 220 and 222, along with example exhaust valve timing for valves 240,242. As shown by the timing diagram, different intake valve timings are shown, with timing "A" corresponding to valve 220, and timing "B" corresponding to valve 222. As shown, the intake duration of valve 220 is approximately 240, although it may range from 210 to 270 crank degrees, for example. The intake duration of valve 222 includes a delayed intake opening of approximately 20 to 60 degrees relative to valve 220, with a common closing timing (although the valves may have different closing timings as well). The intake valve closing timings may be advanced at lower engine speeds, and delayed at higher engine speeds to reduce pushback on the early part of the compression stroke.

As shown, port fuel injection of hydrogen may begin before forward airflow in port 252, yet likelihood of a backfire may still be reduced since the cylinder first receives fresh air from non-fueled port 250. In other words, by injecting hydrogen into only one of the bifurcated ports of a multi-intake-valve engine along with a delayed opening (20-60 degrees) of the fueled port, the residual gas/hot metal in the cylinder is cooled substantially from the air flow of the air-only bifurcated port (in combination with cylinder expansion during intake stroke) and a likelihood of backfire is thereby reduced. When the air-only intake valve is opened, the fuel (H2) is not substantially present; and, when the fueled intake valve is opened, the fuel comes in with fresh charge to interact with a gas/metal temperature that should then be sufficiently cooled.

It should be noted that delaying the fueled-port intake valve event should have virtually no effect on volumetric efficiency at low engine speeds and only a minimal effect at higher engine speeds because it is early in the intake stroke (sufficient time for the cylinder to fill as piston speed slows approaching bottom dead center) and the intake valve timing of only one of the multi-valves is affected. Intake valve closing timing may be advanced at low speeds for the fueled port to reduce pushback on the early part of the compression stroke, and delayed more as speed increases. As noted above, a variable cam timing system may be used to provide valve timing of one or both intake valves.

Figure 4:
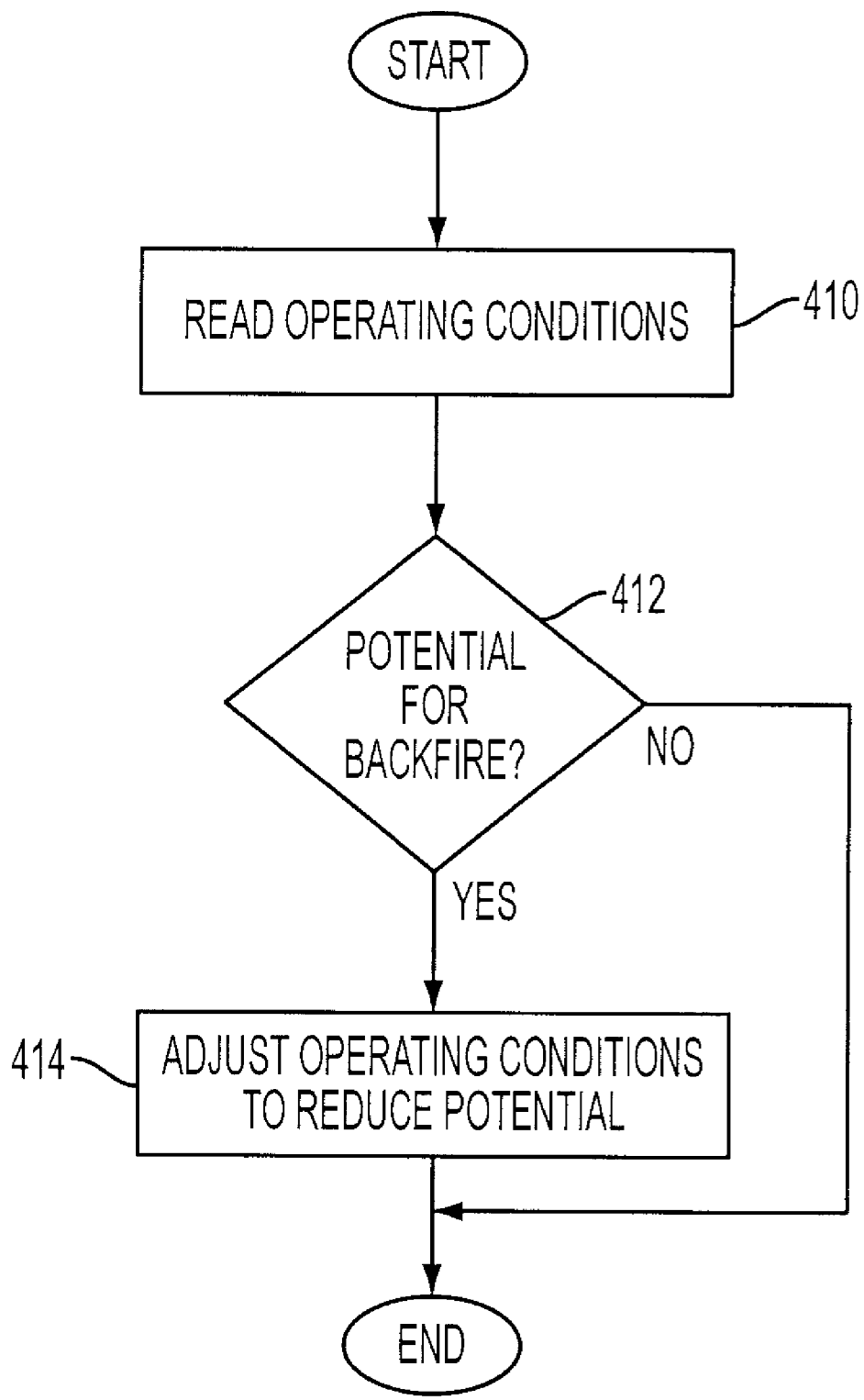
FIG. 4 shows an example flow diagram.

Referring now to FIG. 4, an example flow chart illustrates operation. First, in 410, the routine reads current operating conditions. Then, in 412, the routine identifies whether the current operating conditions create an increased potential for backfire, such as based on engine speed, fuel injection duration greater than a limit, fuel injection end timing greater than a limit, etc. If such conditions are identified, the routine continues to 414 to take various corrective actions. In one example, the routine may delay intake valve opening of intake valve 222 relative to 220. Further, the routine may adjust injection timing so that the injection duration ends before intake valve 222 opens by advancing the start of the injection timing. Further still, the routine may adjust valve advance opening timing of valve 220 while delaying intake valve opening timing of valve 222. Additionally, intake valve closing timing of valve 220 and/or valve 222 may be adjusted.

In this way, valve timing may be adjusted differently depending on whether a potential for backfire exists. For example, a common intake valve opening/closing may be used when the potential is not detected, and staggered intake valve opening may be used when the potential is detected.

Figure 5:
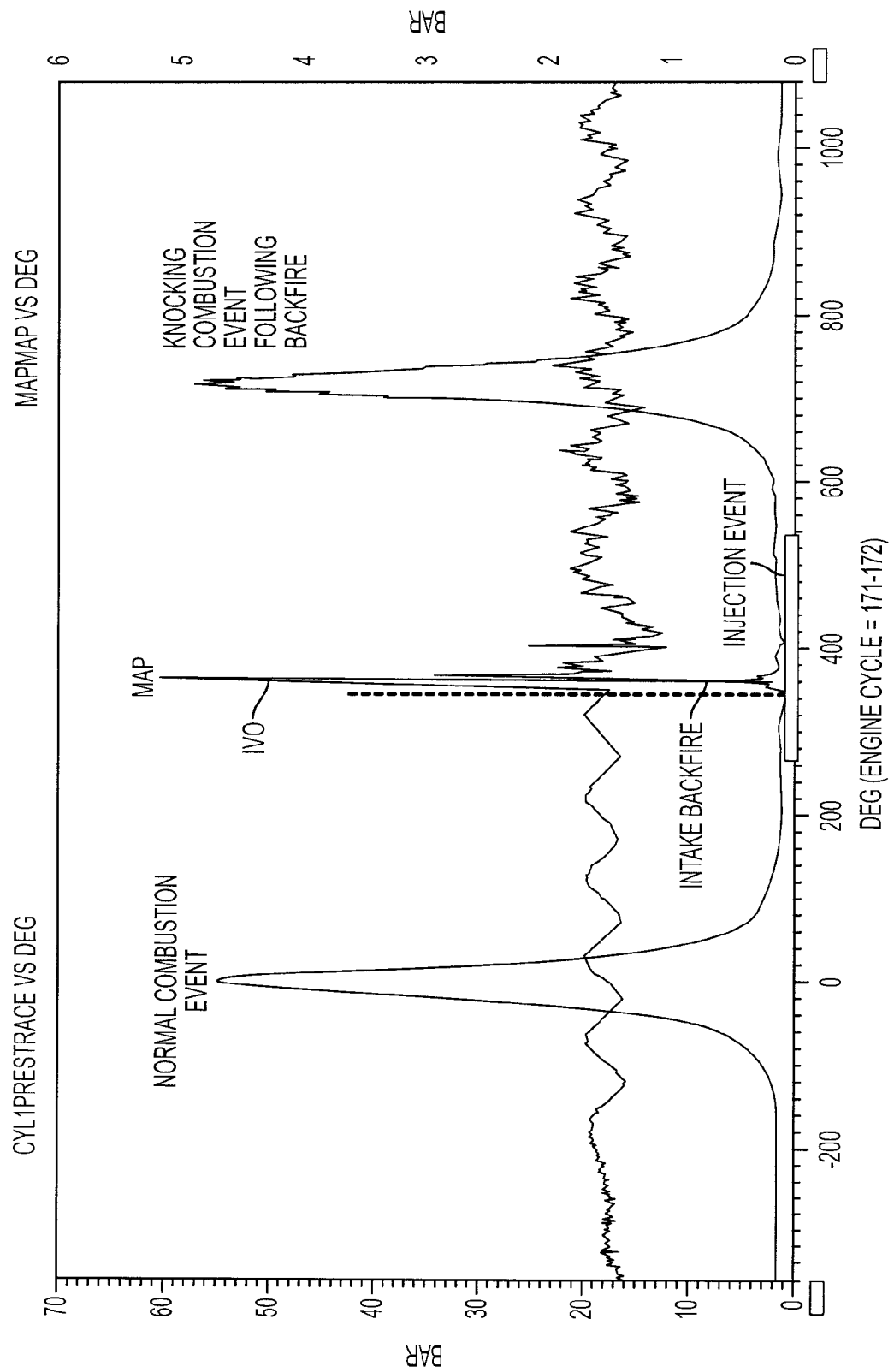
FIG. 5 shows example engine data illustrating engine backfire.

Referring now to FIG. 5, example data is shown that illustrates an example of backfire, at 4000 RPM, with port injected hydrogen having an 11 ms fuel pulsewidth, in which premixed hydrogen and air are delivered to all cylinder intake valves. Backfire occurs concurrent with IVO due to premixed hydrogen and air meeting hot residual/metal temps.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine having a plurality of cylinders, comprising:
an intake having first and second bifurcated ports coupled to first and second intake valve of a cylinder, respectively, where a volume of the first port is at least 30% of cylinder displacement;
an injector coupled exclusively to the first port, the injector coupled to a hydrogen fuel delivery system;
a valve actuator coupled at least to the first intake valve, where for at least a higher engine speed and load condition, the first intake valve is configured to open after the second valve during induction.

2. The system of claim 1 further comprising a controller for adjusting valve timing of the first intake valve responsive to engine speed and engine load.

3. The system of claim 1 further comprising a controller for adjusting valve closing timing of one of the first and second intake valves.

4. A method for operating a gaseous fueled engine, comprising:
delivering gaseous fuel and intake air to a first intake port of a cylinder of the engine;
delivering intake air without gaseous fuel to a second intake port of the cylinder, the first port separated from the second port;
inducting the fuel and intake air from the first port via a first intake valve, and the intake air from the second port via a second intake valve, into the cylinder, where the first intake valve is opened after the second intake valve.

5. The method of claim 4 where the first intake valve is opened more than 20 crank angle degrees after the second intake valve opens.

6. The method of claim 5 further comprising injecting gaseous hydrogen into the first intake port.

7. The method of claim 6 further comprising delivering the gaseous fuel and intake air to the first intake port defining a bifurcation volume that is at least 30% of cylinder displacement to prevent spill over of injected gaseous fuel into the second intake port.

8. The method of claim 7 further comprising adjusting valve timing of at least one of the first and/or second intake valve responsive to engine speed.

9. The method of claim 4 further comprising advancing intake valve closing timing of the first valve at lower speeds, and delaying intake valve closing timing of the first valve at higher speeds.

10. The method of claim 9 further comprising adjusting injection timing based on timing of the first intake valve.

11. The method of claim 4 further comprising combusting the inducted fuel and air.

12. A method for operating a gaseous fueled engine having a cylinder, the cylinder coupled to a first and second intake port, the first intake port coupled to a first valve and the second intake port coupled to a second valve of the cylinder, comprising:
injecting gaseous fuel to a first intake port of a cylinder of the engine without delivering fuel to a second intake port of the cylinder, said fuel delivery starting before the first intake valve opens;
opening the second intake valve before opening the first intake valve; and
combusting intake air inducted through both the first and second intake valves and the delivered gaseous fuel.

13. The method of claim 12, where the fuel injection ends, or the first intake valve opens, before filling the first port with the injected fuel to a point where the fuel migrates to the second intake port.

14. The method of claim 13 further comprising adjusting valve timing of the first intake valve responsive to engine speed and engine load.

15. The method of claim 13 wherein the opening of the second intake valve before opening the first intake valve is performed at least during higher engine speeds.

16. The method of claim 13 further comprising advancing intake valve closing of the first or second intake valve at lower engine speeds, and delaying the intake valve closing at higher engine speeds.

17. The method of claim 13 further comprising adjusting an injection timing such that the injection ends before the first intake valve opens, where larger injection amounts are provided by advancing a start of the injection.

* * * * *